United States Patent [19]

Smith et al.

[11] 4,430,383

[45] Feb. 7, 1984

[54] FILAMENTS OF HIGH TENSILE STRENGTH AND MODULUS

[75] Inventors: Paul Smith, Sittard; Pieter J. Lemstra, Brunssum, both of Netherlands

[73] Assignee: Stamicarbon B.V., Geleen, Netherlands

[21] Appl. No.: 428,821

[22] Filed: Sep. 30, 1982

Related U.S. Application Data

[62] Division of Ser. No. 162,449, Jun. 24, 1980, Pat. No. 4,442,993.

[30] Foreign Application Priority Data

Jun. 27, 1979 [NL] Netherlands .......................... 7904990

[51] Int. Cl.$^3$ .............................................. D02G 3/00
[52] U.S. Cl. .................................... 428/364; 264/210.8
[58] Field of Search ............................... 428/364, 373; 264/210.8, 205, 24, 290.5

[56] References Cited

U.S. PATENT DOCUMENTS

| 3,048,465 | 8/1962 | Jurgeleit | 264/203 |
| 3,962,205 | 6/1976 | Ward et al. | 264/290.5 |
| 4,276,348 | 6/1981 | Wu et al. | 428/373 |

FOREIGN PATENT DOCUMENTS

3004699 8/1980 Fed. Rep. of Germany .
2042414 9/1980 United Kingdom .
2051667 1/1981 United Kingdom .

OTHER PUBLICATIONS

*Polymer Bulletin 1*, pp. 733–736, Published Nov. 1979, by Smith, Lemstra, Kalb and Pennings.
*Makro mol. Chem. 180*, pp. 2983–2986, Published Dec. 1979, by Smith and Lemstra.
*Polymer Bulletin 1*, pp. 871–876, Published Nov. 1979, by Kalb and Pennings.
*Journal of Materials Science*, vol. Fifteen, pp. 505–514, Published Feb. 1980, by Smith and Lemstra.
*Colloid & Polymer Science 258*, pp. 891–894, Published Jul. 1980, by Smith and Lemstra.
Hackh's Chemical Dictionary, Fourth Edition, p. 665.

*Primary Examiner*—Marion McCamish
*Assistant Examiner*—Beverly K. Johnson

[57] ABSTRACT

The invention relates to the preparation of filaments with a high tensile strength and a high modulus and to the filaments thus prepared. A solution of a linear polyethylene with a weight-average molecular weight of at least $4 \times 10^5$ is spun and the filaments, from which the solvent may have been removed in whole or in part, are drawn using a draw ratio of at least $(12 \times 10^6 / \overline{M}_w) + 1$. The filaments are drawn at a temperature such that the modulus is at least 20 GPa.

The invention allows filaments to be prepared at high drawing rates, of 0.5 sec$^{-1}$ or more, with a modulus of at least 20 GPa and a tensile strength of at least 1 GPa.

2 Claims, No Drawings

FILAMENTS OF HIGH TENSILE STRENGTH AND MODULUS

This is a division of application Ser. No. 162,449 filed June 24, 1980, now U.S. Pat. No. 4,422,993.

This invention relates to polyethylene filaments to high tensile strength and modulus and to a process for preparing polyethylene filaments by spinning a solution of a high-molecular linear polymer and drawing the filaments.

Filaments can generally be prepared by spinning linear polymers. A suitable polymer is reduced to a liquid state (melt or solution) and then spun. The arbitrarily-oriented molecular chains in the filaments thus formed are then aligned longitudinally in the filament by drawing. Chain-structured molecules are a major pre-requisite for spinnability to filaments, although other substances may also be spinnable. Branches on the polymer molecule influence filament formation and mechanical properties generally adverse. For this reason, polymers generally used for the drawing of filaments are as linear as possible even though a limited degree of polymer branching will often be unavoidable and in fact permissible.

The most economic and most frequently applied method for producing filaments is melt spinning, i.e., molten polymer is spun to filaments. The melt spinning of linear polyethylene and other polymers is itself also already known. For this purpose, the material to be spun must be meltable and be stable in the molten state. The viscosity of the melt must also permit a reasonable spinning rate. Generally, for a meltable polymer, the spinnability decreases with increasing molecular weight.

Those polymers that melt above their decomposition temperature, or are relatively unstable in the molten condition, are frequently spun from a solution. In a spinning from a solution, the filaments can be fed into an evaporating chimney, so-called dry spinning, or into a precipitation or cooling bath, so-called wet spinning. The solvent can be washed out in the cooling bath.

In the dry spinning technique, hot air is usually blown through the evaporating chimney, to evaporate the solvent completely or to a large extent from the filament. The temperature in at least part of the chimney is below the polymer melting point. The mechanical strength of the filaments, which is still very low when a filament leaves the spinning aperture, increases in the chimney, but remains relatively low. The strength of the filaments is increased by the subsequent drawing, one of the major after-treatments of spun filaments. As a result of the slight, or even zero orientation of the chain molecules of the linear polymer, filaments possess a great deformability in the undrawn state, i.e., the modulus is low. After drawing, the macromolecules are oriented longitudinally and the strength and the modulus of the filaments is thus increased.

In general, the spun filaments must be drawn above the glass transition temperature Tg of the polymer. On the other hand, drawing should preferably be performed below the melting point of the polymer, because above this temperature the motion of the macromolecules soon becomes so great that the desired orientation cannot be achieved, or the orientation is insufficient. It is often advisable to effect drawing at a temperature that is at least 10° C. below the melting point. The intramolecular heat generation resulting from the drawing work performed on the filaments must also be taken into account. At high drawing speeds the temperature of the filaments can thus rise sharply, and it should be ensured that it does not approach or even exceed the melting point.

Nonetheless, the strength of drawn filaments in many cases remains far below the values that could be expected theoretically.

Many attempts have already been made to produce filaments wherein the tensile strength and modulus approximate more closely the theoretical potential. These attempts, a review of which is given in publications by Juyn in Plastica 31 (1978) 262–270 and by Bigg in Polymer Eng. Sci. 16 (1976) 725–734, have not yet produced satisfying results: The modulus or tensile strength often leave much to be desired, or there are technical or economic objections that render the proposed methods unattractive. In particular, the processing rates are low, as is mentioned in the article by Juyn.

Attempts to prepare polyethylene filaments with a high strength and modulus have been described, inter alia, in Netherlands Patent Application Nos. 7402956 and 7413069, which relate to the melt spinning of polyethylene with a weight-average molecular weight of less than 300,000. According to Netherlands Patent Application No. 7612315 by the same applicant, polyethylene with a higher molecular weight of up to 2,000,000 can also be processed. The examples, however, describe only the extremely slow drawing of moulded dumb-bell polyethylene samples with a molecular weight of at most 800,000 in an Instron tensile strength tester, or the drawing of filaments melt-spun from polyethylene with a molecular weight ($\overline{M}_w$) of 312,000 or lower.

Netherlands Patent Application No. 6501248 describes the preparation of filaments of heat-sensitive polymers by spinning solutions thereof. According to this application, heat-sensitive polymers of, e.g., polyethylene or polypropylene, have such a high molecular weight that they do not melt without severe decomposition. The filaments produced by spinning a solution of, say, a polyethylene with a molecular weight of 1 to 3 million are then reeled. Nothing is said about the drawing method (draw ratio, drawing speed, etc.), or about the final strength. The reeled threads must first be subjected to a laborious washing treatment. Shrinkage occurs in washing the gel-like threads on the reel, which leads to greatly varying stretch in the reeled thread and may even result in rupturing.

Netherlands Patent Application No. 7605370 describes a method by which polyethylene filaments with very good mechanical properties, in particular having a high modulus and tensile strength, can be prepared. The production rate, however, is less than 1 m/min and economic production is not feasible by this method.

The present invention has as its object to provide an economic method for preparing polyethylene filaments with a high modulus and high strength from a linear polymer, in particular from high molecular weight polyethylene.

These and other objects will be hereinafter understood from the description which follows and the Figures, of which:

FIGS. 1 and 2 are graphical illustrations which represent data derived from Examples I–III and which, respectively, show the moduli and tensile strengths achieved by drawing a high molecular weight polyethylene at various draw ratios and at different temperatures and solvent content.

FIGS. 3 and 4 are graphical illustrations which represent data derived from Examples IV–V and which, respectively, show the moduli and tensile strengths at various draw ratios for a high molecular weight polyethylene draw at different temperatures and solvent content.

FIGS. 5 and 6 are graphical illustrations which represent data derived from Examples VI–VIII and which, respectively, show the moduli and tensile strengths achieved at various draw ratios for different molecular weights of polyethylene.

FIG. 7 is a graphical illustration showing how modulus varies with tensile strength for filaments drawn from polyethylene having different molecular weights and spun as noted in Example IX and Comparative Examples A and B.

According to this invention, filaments with a high strength and high modulus can be produced by spinning a linear polyethylene with a weight-average molecular weight ($\overline{M}_w$) of at least $4 \times 10^5$ and preferably at least $8 \times 10^5$ and drawing the resulting filaments with a draw ratio of at least $(12 \times 10^6/\overline{M}_w)+1$, at a temperature such that at the draw ratio chosen the filaments acquire a modulus of at least 20 GPa. The modulus is defined as the stress required to effect a unit deformation.

The deformation may be a change in length (Young's modulus), a torsion or shear, or a change in volume. The modulus is here measured on filaments at 23° C. on an Instron tensile strength tester. The sample length between the clamps was 15 cm and the elongation rate during the test 10 cm/min. The modulus values given below are the initial moduli.

Solutions of high-molecular weight linear polyethylene ($M_w > 4 \times 10^5$) in general have a concentration of at least 1% and at most about 50 wt. % polyethylene. Solutions with concentrations below 1 wt. % may be spun, but the spinning thereof does not in general bring any advantages, although with very high-molecular weight polyethylene it may sometimes be favorably processed in solutions with concentrations of less than 1 wt. %. Advantageously, the solution concentration will lie between 1 and 20 wt. %, preferably 1 to 10 wt. %, depending in part on the particular polyethylene entity involved, in the practice of this invention.

High-molecular weight polyethylene is here taken to mean polyethylene that may contain minor amounts, preferably at most 5 molecules %, of one or more other alkenes copolymerized therewith, such as propylene, butylene, pentene, hexene, 4-methyl pentene, octene, etc., and with an average of less than one side chain per 100 carbon atoms, preferably with an average of less than 1 side chain per 300 carbon atoms, and also with a weight-average molecular weight of at least about $4 \times 10^5$, preferably at least about $8 \times 10^5$ and generally up to about $15 \times 10^5$, or more. The polyethylene used may also contain admixed therewith minor amounts, preferably at most 25 wt. %, of one or more other polymers, in particular an alkene-1-polymer such as polypropylene, polybutylene or a copolymer of propylene with a minor amount of ethylene.

The filaments spun by the method according to this invention are upgraded according to usual methods. They may be fed into a chimney through which hot air can be passed, and in which all or part of the solvent may be evaporated. The solvent can also be washed out of the filaments in whole or in part, or further removed from them by evaporation in a zone following the chimney. The filaments from which all or part of the solvent has been evaporated or removed by washing, that is to say the filaments containing in general less than 25 wt. % and preferably less than 10 wt. % solvent, are then highly drawn. The filaments leaving the spinneret may also be fed into a space in which they are cooled without substantial solvent evaporation until a gel-like filament is formed, and this filament is drawn. When solvent-containing filaments are drawn, it is advisable to evaporate or wash from the filaments as much of the solvent as possible during drawing, although it may also be removed from the filaments after drawing.

It has been found that as the draw ratio increases, the modulus and the tensile strength increase. The draw ratio cannot be increased indefinitely, as rupturing occurs, of course, at too high draw ratios. It can be easily established, experimentally, at what draw ratio filament rupturing is so frequent as to interfere with production continuity to an unacceptable degree.

It has also been found that unusually high draw ratios can be applied when the present method is applied. The draw ratio is preferably at least $(14 \times 10^6/\overline{M}_w)+1$, more specifically, at least $(18 \times 10^6/\overline{M}_w)+1$, and can be as high as 50 in certain situations, but maintained below the level of an uneconomic rupturing frequency.

The high draw ratios can be attained with the present method at high drawing speeds. The drawing speed is the difference between the rate of take-off (from the drawing roller) and the rate of feed (onto the feed roller) per unit drawing zone, and is expressed in $\text{sec}^{-1}$. With the present method, the drawing speed can amount to, e.g., 0.5 $\text{sec}^{-1}$ or even 1 $\text{sec}^{-1}$ or more.

To obtain the high modulus values required, drawing must be performed below the melting point of the polyethylene. The drawing temperature is therefore, in general, at most about 135° C. With the drawing below 75° C., results are no longer satisfactory and the drawing temperature should therefore be at least about 75° C.

It has furthermore been found that as the molecular weight increases, the attainable moduli, but especially the attainable tensile strengths, increase. It is therefore preferable to process a polyethylene with a molecular weight ($\overline{M}_w$) of at least $8 \times 10^5$. As the molecular weight of the polyethylene increases, it becomes more difficult to process. Dissolution in a suitable solvent becomes more time-consuming, the solutions become more viscous at given concentration, and the attainable spinning rates consequently decrease, while rupturing during drawing occurs more readily. For this reason, polyethylene with a molecular weight ($\overline{M}_w$) above about $15 \times 10^5$ will not in general be used, although the present method is feasible with higher molecular weights (see, e.g., Example IX infra). The weight-average molecular weight ($\overline{M}_w$) can be determined by known methods by gel permeation chromatography or light scattering.

The choice of solvent is not critical. Any suitable solvent may be used, e.g., halogenated or non-halogenated hydrocarbons having the requisite solvent properties to enable preparation of the desired polyethylene solution. In most solvents, polyethylene is soluble only at temperatures of at least 90° C. In conventional spinning processes, the space in which the filaments are spun is at atmospheric pressure. Low-boiling solvents are therefore less desirable, because they can evaporate so rapidly from the filaments that they come to act more or less as foaming agents and interfere with the structure of the filaments.

The temperature of the solution in spinning is preferably at least 100° C., more specifically at least 120° C., and the boiling point of the solvent is preferably at least 100° C., more specifically at least equal to the spinning temperature. The boiling point of the solvent should not be so high as to render it difficult to evaporate it from the spun filaments. Suitable solvents are aliphatic, cycloaliphatic aromatic hydrocarbons with boiling points of at least 100° C., such as octane, nonnane, decane or isomers thereof, and higher branched or unbranched hydrocarbons, petroleum fractions with boiling ranges above 100° C., toluenes or xylenes, naphthalene, hydrogenated derivatives thereof, such as tetralin, decalin, but also halogenated hydrocarbons and other known solvents. In view of the low cost price, preference will usually be given to nonsubstituted hydrocarbons, including hydrogenated derivatives of aromatic hydrocarbons.

The spinning temperature and the temperature of dissolution must not be so high as to lead to considerable thermal decomposition of the polymer. In general, the temperatures employed will therefore not be above 240° C. Consequently, the boiling point of the solvent will generally not exceed about 250° C.

Surprisingly, it is found that filaments with a greater modulus and strength can be produced by the present solution spinning method than by melt spinning of the same polymer, drawing conditions being as far as possible the same, e.g., with the same drawing temperature and drawing rate.

In conventional methods for spinning solutions, the diameters of the spinning apertures in the spinnerets are often small. In general, the diameters are only 0.02–1.0 mm. Especially if small spinning apertures (<0.2 mm) are used, it is found that the spinning process is very sensitive to contaminants in the spinning solution, and this solution must be carefully freed and kept free of solid contaminants. The spinnerets are usually provided with filters. Nonetheless, it is still found that the spinnerets have to be cleaned after a short time and blockage is still often found to occur. With the present method, larger spinning apertures, of more than 0.2 mm., for example from 0.5 to 2.0 mm or more, can be used, as the drawing ratios used herein can be large and, additionally, fairly low polymer concentrations are used in the spinning solution.

The filaments according to this invention are suitable for a variety of applications. They can be used as reinforcement in a variety of materials for which reinforcement with fibers or filaments is known, for tire cords, and for all applications in which low weight combined with high strength is desired, such as rope, nets, filter cloths, etc.

If so desired, minor quantities, in particular quantities of 0.1–10 wt. % relative to the polymer, of conventional additives, stabilizers, fiber treatment agents and the like can be incorporated in or applied on the filaments.

The invention will be further understood by reference to the following examples, without, however, being thereby restricted.

EXAMPLES I–III

A high molecular weight linear polyethylene of $\overline{M}_w = 15 \times 10^5$ is dissolved at 145° C. in decalin to form a 2 wt. % solution. This solution is spun at 130° C. by a spinneret with a spinning aperture of 0.5 mm diameter through an evaporating-type spinning chimney.

I. In one series of experiments, no air was blown through the spinning chimney. The filament was only cooled in the chimney, resulting in a gel-like filament being obtained from the chimney that still contained more than 90% solvent. This filament was then drawn in a 1 meter long drawing chamber maintained at 120° C. The drawing speed was about 1 sec$^{-1}$. The draw ratio was varied between 2 and more than 30. The modulus and tensile strength were then determined for filaments drawn at different draw ratios. The values of the modulus and draw ratio are represented in FIGS. 1 and 2 by open circles (○), with the respective modulus and the tensile strength, in GPa, being plotted along the respective ordinates and the draw ratio along the abscissa.

II. In a second experimental series, air heated to 60° C. was blown through the evaporating-type spinning chimney. The filament emerging from the chimney still contained 6 wt. % solvent and was drawn in the same way as in Example I. The values of modulus and the tensile strength (ordinate) and the draw ratio (abscissa) are represented in FIGS. 1 and 2 by solid circles (●).

III. In a third experimental series, air heated to 60° C. was blown through the evaporating-type spinning chimney. The filament emerging from the chimney was next fed through a methanol bath, in which the solvent was washed out of the filament. The filament was then drawn as in Example I. The values of modulus, tensile strength and draw ratio are represented in FIGS. 1 and 2 by solid triangles (▲). Somewhat higher draw ratios can be achieved in drawing solvent-containing filaments (Example I) than with filaments containing little or no solvent (Examples II and III). In the former case, the values of the modulus and tensile strength attainable are therefore greater.

EXAMPLES IV–V

A high molecular weight linear polyethylene of $\overline{M}_w = 10 \times 10^5$ was dissolved at 145° C. in decalin to form a 3 wt. % solution. The solution was spun at 130° C. through a spinning aperture with a diameter of 0.5 mm into an evaporating-type spinning chimney.

IV. As in Example I, the filament was only cooled in the chimney. The gel-like filament, containing more than 90% solvent, was drawn in two series of experiments as described in Example I, at 93° C. and at 106° C. An attempt to perform a third series of experiments at a drawing temperature of 142° C. failed due to the filament continually melting away and consequently rupturing.

V. Air heated at 60° C. was blown through the evaporating-type spinning chimney. The filament emerging from the spinning chimney contained about 6 wt. % solvent. Three series of experiments were performed. The filaments were drawn at 93° C., 106° C., and 142° C.

The moduli and the tensile strengths were determined for filaments prepared according to Examples IV and V with varying draw ratios, from 2 to more than 40. FIG. 3 and FIG. 4 shown the respective moduli and the tensile strengths in GPa (along the respective ordinates), plotted versus the draw ratios (along the abscissa).

In FIGS. 3 and 4:

The values measured for gel-like filaments drawn at 93° C. (IV above) are represented by open circles (○).

The values measured for gel-like filaments at 106° C. (IV above) are represented by open triangles (△).

The values measured for substantially dry filaments drawn at 93° C. (V above) are represented by solid circles (●).

The values measured for substantially dry filaments (i.e., filaments containing approximately 6 wt. % solvent) drawn at 106° C. (V above) are represented by solid triangles (▲).

The values measured for substantially dry filaments drawn at 142° C. (V above) are presented by semi-solid circles (◐).

A modulus of 20 GPa cannot be achieved at a drawing temperature of 142° C. and as a result, the value of the tensile strength also remains considerably below 1 GPa. 1 GPa=$10^9$ Pa. 1 Pa=1 Pascal=1 N/m$^2$.

EXAMPLE VI

A polyethylene, sample A, of molecular weight $\overline{M}_w=15\times10^5$ was dissolved at 145° C. in decalin to form a 2 wt. % solution and then spun as in Example II and drawn at varying draw ratios.

In FIGS. 5 and 6, the respective moduli and the tensile strengths, in GPa (along the ordinates), plotted versus the draw ratios (along the abscissa), are indicated by semi-solid circles (◐).

EXAMPLE VII

Example VI was repeated with a polyethylene sample B of molecular weight $\overline{M}_w=8\times10^5$ dissolved in decalin to form a 4 wt. % solution. The moduli and tensile strengths measured are represented in the same manner as above in FIG. 5 and FIG. 6 by open circles (○).

EXAMPLE VIII

Example VI was repeated with a polyethylene sample C of molecular weight $\overline{M}_w=6\times10^5$ dissolved in decalin to form an 8 wt. % solution. The moduli and tensile strengths are similarly represented in FIG. 6 and FIG. 6 by solid circles (●).

EXAMPLE IX

Example VI was repeated with a polyethylene of molecular weight $\overline{M}_w=40\times10^5$ dissolved in decalin to a 1 wt. % solution.

The respective moduli and tensile strengths of filaments drawn at varying draw ratios were measured and plotted versus each other along the abscissa and along the ordinate, respectively, of FIG. 7. The relation is shown by curve IX in that Figure.

The moduli and tensile strengths of filaments prepared as in Examples V and VI are also represented by curves V and VI in FIG. 7.

COMPARATIVE EXAMPLES A AND B

According to the method of Example II, filaments of a polyethylene sample of $\overline{M}_w=280,000$ (2.8×$10^5$) and a polyethylene sample of $\overline{M}_w=60,000$ (0.6×$10^5$) were spun from respectively 20 and 50 wt. % solutions in decalin. The relation between modulus and tensile strength is represented in FIG. 7 by curve A for the polyethylene of $\overline{M}_w=280,000$ and by curve B for the polyethylene of $\overline{M}_w=60,000$.

FIG. 7 shows that, with decreasing molecular weight, a tensile strength of 1 GPa is achieved only at an even higher modulus and an accordingly higher draw ratio and in the long run can no longer be achieved at all.

What is claimed is:

1. A solution-spun and drawn high molecular weight $\overline{M}_w$ polyethylene filament of combined high modulus and high tensile strength wherein
    said molecular weight $\overline{M}_w$ is at least 8×$10^5$,
    said modulus is at least 20 GPa,
    said tensile strength is at least 2 GPa.

2. A solution-spun and drawn high molecular weight $\overline{M}_w$ polyethylene filament of combined high modulus and high tensile strength wherein
    said molecular weight $\overline{M}_w$ is at least 8×$10^5$,
    said modulus is at least 20 GPa,
    said tensile strength is at least 2 GPa,
and wherein
    said filament has been drawn at a draw ratio of at least $(12\times10^6/\overline{M}_w)+1$.

* * * * *